(12) United States Patent
Ackermann et al.

(10) Patent No.: US 11,144,337 B2
(45) Date of Patent: Oct. 12, 2021

(54) IMPLEMENTING INTERFACE FOR RAPID GROUND TRUTH BINNING

(71) Applicant: International Business Machines Corporation, Armonk, NY (US)

(72) Inventors: Christopher F. Ackermann, Fairfax, VA (US); Charles E. Beller, Baltimore, MD (US); Michael Drzewucki, Woodbridge, VA (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 16/181,797

(22) Filed: Nov. 6, 2018

(65) Prior Publication Data

US 2020/0142720 A1 May 7, 2020

(51) Int. Cl.
*G06F 3/048* (2013.01)
*G06F 9/451* (2018.01)
*G06F 3/01* (2006.01)
*G06N 5/02* (2006.01)
*G06F 16/93* (2019.01)
(Continued)

(52) U.S. Cl.
CPC .............. *G06F 9/453* (2018.02); *G06F 3/018* (2013.01); *G06F 16/93* (2019.01); *G06F 40/295* (2020.01); *G06N 5/02* (2013.01); *G06F 40/169* (2020.01)

(58) Field of Classification Search
CPC .......... G06N 20/00; G06N 7/005; G06N 5/02; G06F 17/27; G06F 17/2775; G06F 16/287; G06F 16/288; G06F 16/313; G06F 16/3334; G06F 16/9038; G06F 17/274; G06F 17/277; G06F 16/245; G06F 16/24564; G06F 16/3322; G06F 16/3323; G06F 17/272; G06F 17/2765; G06F 17/2785; G06F 16/93; G06F 17/278; G06F 16/3346; G06F 16/951; G06F 17/2715; G06F 17/28; G06F 16/248; G06F 17/18; G06F 9/453; G06F 40/295; G06F 3/018; G06F 40/169; G06F 16/26; G06F 16/355;
(Continued)

(56) References Cited

U.S. PATENT DOCUMENTS 6,438,543 B1  8/2002  Kazi et al.
6,658,626 B1 * 12/2003 Aiken .................. G06F 40/289
                                                           715/205

(Continued)

OTHER PUBLICATIONS

Disclosed Anonymously, IPCOM000231089D.pdf, Sep. 25, 2013, IP.com, pp. 1-3 (Year: 2013).*

(Continued)

*Primary Examiner* — Steven B Theriault
(74) *Attorney, Agent, or Firm* — Peter J. Edwards

(57) ABSTRACT

A method, system and computer program product are provided for implementing an interface for rapid ground truth binning. A set of documents are received wherein each document has at least one entity in a set of entities. A user interface is provided for each received document allowing a user to view passages and select options related to confirming or denying an equivalence between the entity in the received document and an output document entity bin including the entity. Responsive to the user utilizing the user interface and confirming the equivalence, combining the received document with the output document entity bin with reference to the entity.

13 Claims, 4 Drawing Sheets

(51) Int. Cl.
*G06F 40/295* (2020.01)
*G06F 40/169* (2020.01)

(58) Field of Classification Search
CPC .. G06F 3/017; G06F 3/04842; B65H 2511/20
See application file for complete search history.

(56) References Cited

U.S. PATENT DOCUMENTS

| | | | | |
|---|---|---|---|---|
| 7,657,544 | B2* | 2/2010 | Suzuki | G06F 16/345 |
| | | | | 715/705 |
| 7,783,976 | B2* | 8/2010 | Endo | G06F 40/194 |
| | | | | 715/273 |
| 8,010,538 | B2* | 8/2011 | Pedersen | G06F 16/93 |
| | | | | 707/749 |
| 8,121,989 | B1* | 2/2012 | Gengelbach | G06F 40/194 |
| | | | | 707/695 |
| 8,296,247 | B2* | 10/2012 | Zhang | G06N 20/00 |
| | | | | 706/12 |
| 8,306,940 | B2* | 11/2012 | Lee | G06N 20/00 |
| | | | | 706/61 |
| 8,594,996 | B2* | 11/2013 | Liang | G06F 40/10 |
| | | | | 704/9 |
| 8,726,144 | B2 | 5/2014 | Chidlovskii et al. | |
| 8,856,109 | B2* | 10/2014 | Karidi | G06F 16/9535 |
| | | | | 707/723 |
| 8,892,596 | B1* | 11/2014 | Semturs | G06F 16/958 |
| | | | | 707/769 |
| 9,104,960 | B2* | 8/2015 | Bottou | G06Q 30/0242 |
| 9,208,179 | B1* | 12/2015 | Song | G06F 16/10 |
| 9,235,624 | B2* | 1/2016 | Zhou | G06F 16/24558 |
| 9,535,894 | B2* | 1/2017 | Carrier | G06F 40/242 |
| 9,569,732 | B2* | 2/2017 | Gosink | G06F 30/20 |
| 9,632,994 | B2 | 4/2017 | Naim et al. | |
| 9,697,475 | B1* | 7/2017 | Subramanya | G06N 20/00 |
| 9,852,337 | B1* | 12/2017 | van Rotterdam | G06K 9/00483 |
| 9,984,050 | B2 | 5/2018 | O'Keeffe et al. | |
| 10,209,867 | B1* | 2/2019 | Becker | G06F 3/04842 |
| 10,304,191 | B1* | 5/2019 | Mousavian | G06T 7/70 |
| 10,496,754 | B1* | 12/2019 | Ferrucci | G06N 20/00 |
| 10,613,785 | B1* | 4/2020 | Beskales | H03M 7/3091 |
| 10,831,725 | B2* | 11/2020 | Shimanovsky | G06N 5/022 |
| 2002/0129342 | A1* | 9/2002 | Kil | G06F 16/2465 |
| | | | | 717/137 |
| 2004/0133560 | A1* | 7/2004 | Simske | G06F 16/355 |
| 2005/0226261 | A1* | 10/2005 | Varadarajan | G06F 16/93 |
| | | | | 370/412 |
| 2006/0010128 | A1* | 1/2006 | Suzuki | G06F 16/35 |
| 2006/0048076 | A1* | 3/2006 | Vronay | G06F 16/904 |
| | | | | 715/850 |
| 2007/0067285 | A1* | 3/2007 | Blume | G06Q 10/10 |
| 2007/0214133 | A1* | 9/2007 | Liberty | G06F 16/3338 |
| 2009/0083200 | A1* | 3/2009 | Pollara | G06N 20/00 |
| | | | | 706/14 |
| 2009/0150388 | A1* | 6/2009 | Roseman | G06F 16/3344 |
| 2009/0281789 | A1* | 11/2009 | Waibel | G06F 17/2735 |
| | | | | 704/3 |
| 2009/0319560 | A1* | 12/2009 | Cheng | G06K 9/00771 |
| 2010/0250474 | A1* | 9/2010 | Richards | G06Q 10/06 |
| | | | | 706/12 |
| 2010/0280985 | A1* | 11/2010 | Duchon | G06N 7/005 |
| | | | | 706/52 |
| 2011/0106807 | A1* | 5/2011 | Srihari | G06F 16/288 |
| | | | | 707/739 |
| 2011/0213742 | A1* | 9/2011 | Lemmond | G06F 16/3344 |
| | | | | 706/13 |
| 2011/0320459 | A1* | 12/2011 | Chisholm | G06F 16/36 |
| | | | | 707/748 |
| 2012/0051657 | A1* | 3/2012 | Lamanna | G06F 40/194 |
| | | | | 382/218 |
| 2012/0253793 | A1* | 10/2012 | Ghannam | G06F 16/3344 |
| | | | | 704/9 |
| 2013/0007578 | A1 | 1/2013 | Shreck et al. | |
| 2013/0138428 | A1* | 5/2013 | Chandramouli | G06F 17/274 |
| | | | | 704/9 |
| 2014/0079297 | A1* | 3/2014 | Tadayon | G06K 9/00 |
| | | | | 382/118 |
| 2014/0278448 | A1* | 9/2014 | Sadeghi | G06Q 50/22 |
| | | | | 705/2 |
| 2014/0279729 | A1* | 9/2014 | Delaney | G06F 40/30 |
| | | | | 706/12 |
| 2014/0279756 | A1* | 9/2014 | Whitman | G06F 16/635 |
| | | | | 706/12 |
| 2014/0324879 | A1* | 10/2014 | Trease | G06F 16/951 |
| | | | | 707/741 |
| 2015/0044659 | A1* | 2/2015 | Basu | G09B 7/04 |
| | | | | 434/350 |
| 2015/0066938 | A1* | 3/2015 | Ravid | G06F 16/3326 |
| | | | | 707/738 |
| 2015/0324454 | A1* | 11/2015 | Roberts | G06F 16/9032 |
| | | | | 707/734 |
| 2016/0099846 | A1* | 4/2016 | Allen | H04L 41/0896 |
| | | | | 709/223 |
| 2016/0125169 | A1* | 5/2016 | Finn | G06F 16/2358 |
| | | | | 707/692 |
| 2016/0180242 | A1* | 6/2016 | Byron | G06N 5/041 |
| | | | | 706/11 |
| 2016/0267396 | A1* | 9/2016 | Gray | G06N 20/00 |
| 2017/0109326 | A1* | 4/2017 | Tan | G06F 40/279 |
| 2017/0140290 | A1* | 5/2017 | Block | G06N 5/048 |
| 2017/0154015 | A1* | 6/2017 | O'Keeffe | G06F 17/2247 |
| 2017/0357852 | A1* | 12/2017 | Cai | G06K 9/6215 |
| 2018/0025008 | A1* | 1/2018 | Tan | G06F 16/3331 |
| | | | | 707/737 |
| 2018/0039910 | A1 | 2/2018 | Hari Haran et al. | |
| 2018/0068221 | A1* | 3/2018 | Brennan | G06N 20/00 |
| 2018/0068222 | A1 | 3/2018 | Brennan et al. | |
| 2018/0068232 | A1* | 3/2018 | Hari Haran | G06Q 30/0631 |
| 2018/0075368 | A1* | 3/2018 | Brennan | G06F 16/35 |
| 2018/0113861 | A1* | 4/2018 | Cai | G06F 16/353 |
| 2018/0121819 | A1* | 5/2018 | Manasse | G06F 17/18 |
| 2018/0121820 | A1* | 5/2018 | Manasse | G06F 17/18 |
| 2018/0225471 | A1* | 8/2018 | Goyal | G06F 21/6209 |
| 2018/0225590 | A1* | 8/2018 | Altaf | G06N 20/00 |
| 2018/0300296 | A1* | 10/2018 | Ziraknejad | G06F 16/93 |
| 2019/0130248 | A1* | 5/2019 | Zhong | G06N 3/08 |
| 2019/0171871 | A1* | 6/2019 | Zhang | G06T 7/75 |
| 2019/0172224 | A1* | 6/2019 | Vajda | G06T 7/77 |
| 2019/0325084 | A1* | 10/2019 | Peng | G06Q 10/00 |
| 2020/0004873 | A1* | 1/2020 | Chang | G06F 16/31 |
| 2020/0161005 | A1* | 5/2020 | Lyman | G06T 7/0014 |
| 2020/0226493 | A1* | 7/2020 | Hari Haran | G06F 16/285 |

OTHER PUBLICATIONS

J. Mayfield, D. Alexander, B. J. Dorr, J. Eisner, T. Elsayed, T. Finin, C. Fink, M. Freedman, N. Garera, P. McNamee, and S. Mohammad, "Cross-Document Coreference Resolution: A Key Technology for Learning by Reading," In AAAI Spring Symposium: Learning by Reading and Learning to Read (vol. 9, pp. 65-70). https://www.aaai.org/Library/Symposia/Spring/ss07-06.php.

Christian Morbidoni, and Alessio Piccioli, "Curating a document collection via crowdsourcing with Pundit 2.0," In International Semantic Web Conference, pp. 102-106. Springer, Cham, 2015.

Stefanie Dipper et al., "Simple Annotation Tools for Complex Annotation Tasks: an Evaluation" Link: https://pdfs.semanticscholar.org/d341/35287eb7ca2eca326401b4b4918510badc11.pdf.

"Watson Knowledge Studio (WKS)" https://www.ibm.com/watson/services/knowledge-studio/.

Pontus Stenetorp et al, BRAT: a web-based tool for NLP-assisted text annotation Proceedings of 13th Conf. of European Chapter of Association for Computational Linguistics, pp. 102-107, Apr. 23-27, 2012.

* cited by examiner

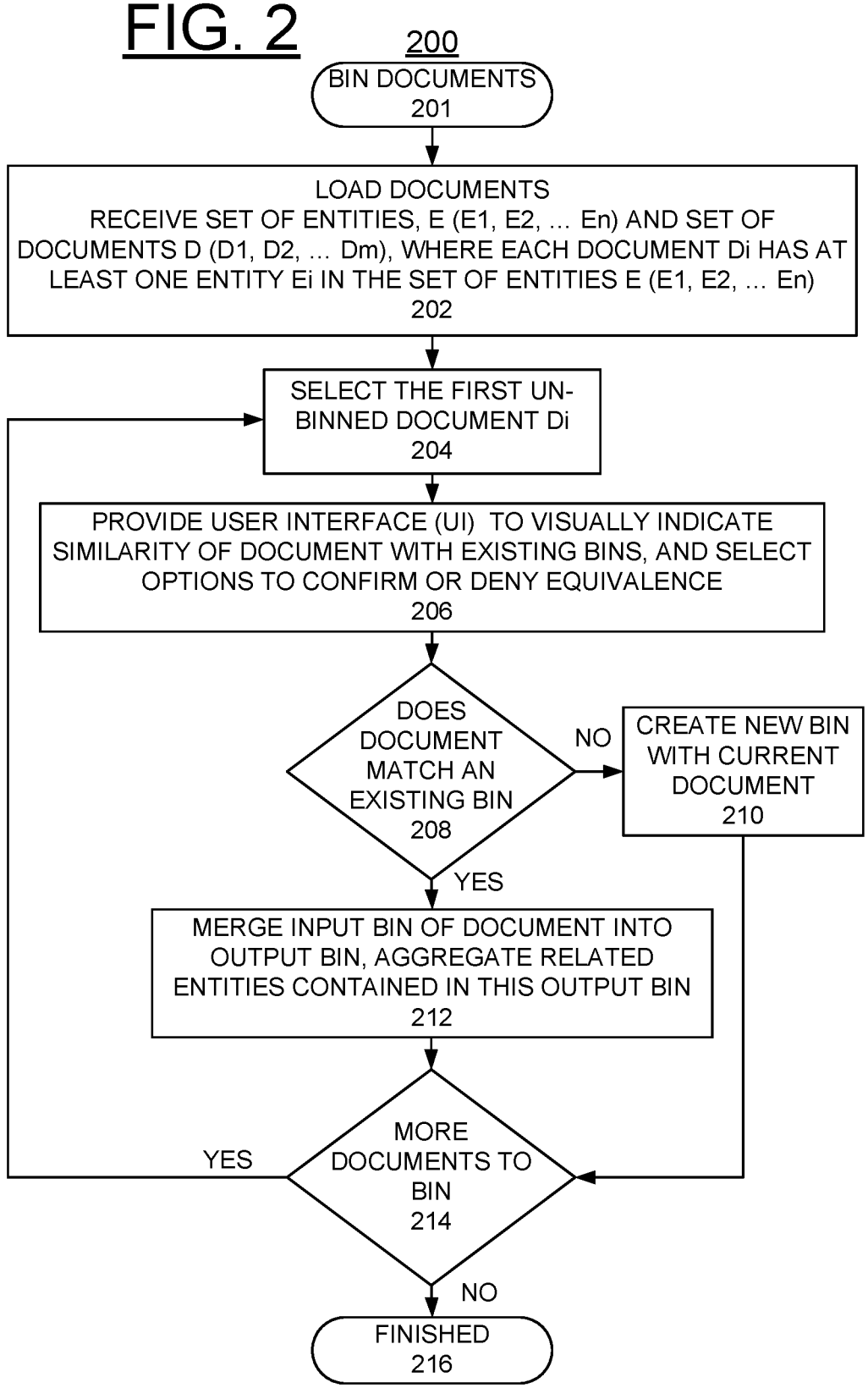

MATCH TASK
301

SEARCH OUTPUT BINS FOR CERTAIN TERMS.
PRESENT CONTENT OF RETRIEVAL STEP IN EASY-TO-READ FORMAT WITH VISUAL GUIDES TO HELP USER IDENTIFY KEY INFORMATION AND SPEED- UP DECISION MAKING PROCESS WITH SEPARATE INPUT AND OUTPUT DOCUMENTS DISPLAYED INCLUDING:
1. DISPLAY BIN'S ENTITY NAME AND TITLES OF DOCUMENTS IN THE BIN'S DOCUMENT COLLECTION;
2. AGGREGATE ALL RELATED ENTITIES FOUND IN THE DOCUMENT COLLECTION AND DISPLAY THEM ABOVE DOCUMENT TEXT;
3. HIGHLIGHT SPANS IN PASSAGES WHERE THE RELATIONSHIP WAS IDENTIFIED.

302

ITERATE THROUGH BINS ENABLING USER TO QUICKLY PARSE THROUGH LIST OF OUTPUT BINS
304

HIGHLIGHT ALL ENTITIES IN ALL OUTPUT BINS THAT MATCH RELATED ENTITIES OF CURRENT DOCUMENT, SORTING OUTPUT BINS BASED ON NUMBER OF ENTITIES THAT MATCH CURRENT DOCUMENT. HIGHLIGHT HOW WELL THE NAME OF SOURCE BIN MATCHES THE NAME OF TARGET BIN.
306

IMPLEMENTING INTERFACE FOR RAPID GROUND TRUTH BINNING

CONTRACTUAL ORIGIN OF THE INVENTION

The United States Government has rights in this invention made in the performance of work under a U.S. Government Contract between the United States of America and IBM Division holding the contract GBS Government Agency issuing the Prime Contract: Defense agencies.

FIELD OF THE INVENTION

The present invention relates generally to the data processing field, and more particularly, relates to a method, system and computer program product for implementing an interface for rapid ground truth binning.

DESCRIPTION OF THE RELATED ART

Identifying coreference entity bins is tedious and time consuming for several reasons: (1) there are potentially a large number of entity bins to review (2) key information that serve as a good indicator of coreference are not easy to spot when manually reading through a bin's document collection, and (3) keeping track of all the input entity bins that are potentially coreference can be overwhelming for a human annotator.

A need exists for a mechanism for rapidly developing ground-truth sets needed to train a statistical cross-document coreference model operating over entity bin objects, while reducing complexity of the overall task.

SUMMARY OF THE INVENTION

Principal aspects of the present invention are to provide a method, system and computer program product for implementing an interface for rapid ground truth binning. Other important aspects of the present invention are to provide such method, system and computer program product substantially without negative effects and that overcome many of the disadvantages of prior art arrangements.

In brief, a method, system and computer program product are provided for implementing an interface for rapid ground truth binning. A set of documents are received wherein each document has at least one entity in a set of entities. A user interface is provided for each received document allowing a user to view passages and select options related to confirming or denying an equivalence between the entity in the received document and an output document entity bin including the entity. Responsive to the user utilizing the user interface and confirming the equivalence, combining the received document with the output document entity bin with reference to the entity.

In accordance with features of the invention, the user interface enables rapidly developing ground-truth sets needed to train a statistical cross-document coreference model operating over entity bin objects, while reducing complexity of the overall task.

In accordance with features of the invention, the user interface displays an entity bin name of the received document and the titles of the documents in a document collection of output document entity bins.

In accordance with features of the invention, the user interface aggregates all related entities found in the document collection of the output document entity bin and displays the related entities found in the document collection above the document text.

In accordance with features of the invention, the user interface highlights the spans in the text passages from both the received document and the document collection of the output document entity bin from which the relationship was identified.

In accordance with features of the invention, the user interface provides visual guides to help the user identify key information and, therefore, speed up the decision-making process. The user interface separately organizes and displays an entity bin of the input document and the output document entity bins.

In accordance with features of the invention, the user interface provides a search capability allowing the user to filter the output document entity bins for certain terms.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2, and 3 are respective flow chart illustrating example system operations to implement an interface for rapid ground truth binning in the example computer system of FIG. 1 in accordance with preferred embodiments.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized, and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and system are provided for implementing an interface for rapid ground truth binning. Ground truth binning refers to information provided by direct observation rather than information provided by inference. Human curators are given a set of naive entity bins, or bins with a single document in their collection, produced from a query. The task is to merge together entity bins referring to the same real-world entity. The invention provides a user interface for rapidly developing the ground-truth sets needed to train a statistical cross-document coreference model operating over entity bin objects.

Figure 1:
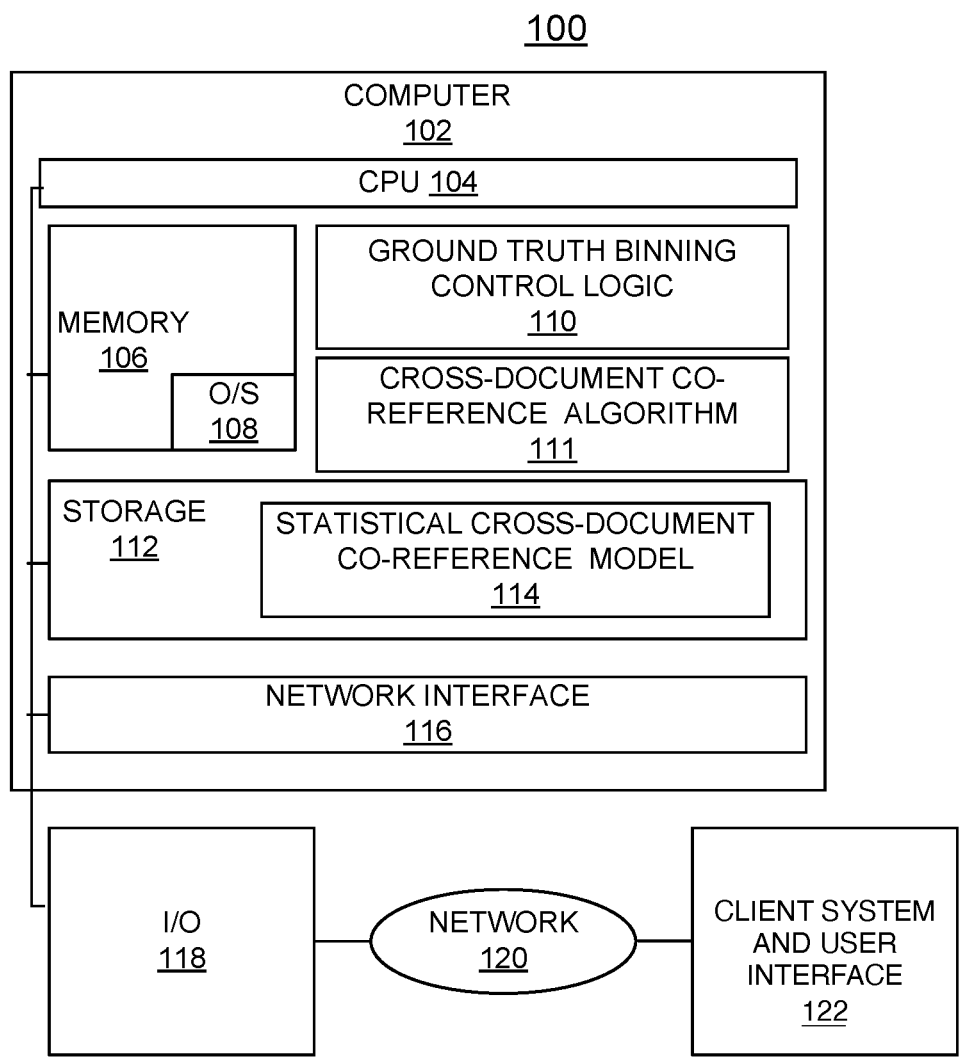
FIG. 1 provides a block diagram of an example computer system for implementing an interface for rapid ground truth binning in accordance with preferred embodiments.

Having reference now to the drawings, in FIG. 1, there is shown an example system embodying the present invention generally designated by the reference character 100 for implementing an interface for rapid ground truth binning in accordance with preferred embodiments. System 100 includes a computer system 102 including one or more processors 104 or general-purpose programmable central processing units (CPUs) 104. As shown, computer system 102 includes a single CPU 104; however, system 102 can include multiple processors 104 typical of a relatively large system.

Computer system 102 includes a system memory 106 including an operating system 108, a ground truth binning control logic 110 and a cross-document co-reference algorithm 111 in accordance with preferred embodiments. System memory 106 is a random-access semiconductor memory for storing data, including programs. System memory 106 is comprised of, for example, a dynamic random-access memory (DRAM), a synchronous direct random-access memory (SDRAM), a current double data rate (DDRx) SDRAM, non-volatile memory, optical storage, and other storage devices.

Computer system 102 includes a storage 112 including a statistical cross-document co-reference model 114 in accordance with preferred embodiments and a network interface 116. Computer system 102 includes an I/O interface 118 for transferring data to and from computer system components including CPU 104, memory 106 including the operating system 108, ground truth binning control logic 110, cross-document co-reference algorithm 111, storage 112 including statistical cross-document co-reference model 114, and network interface 116, and a network 120 and a client system, and user interface 122.

In accordance with features of the invention, the ground truth binning control logic 110 enables manually creating ground truth sets to train the cross-document co-reference or disambiguation algorithm 111. The ground truth binning control logic 110 presents a user interface with information in a way that significantly reduces the effort and time to create the ground truth sets, allowing for rapid adaptation of the algorithm to new domains. The input to the ground truth binning control logic 110 is a set of entity bins E (E1, E2, . . . , En). The set of entity bins E (E1, E2, . . . , En) are pairs consisting of an entity name and a collection of documents that contain a reference to that entity. The task of the human annotator is to identify which of the input bins are references to the same real-world entity and merge such co-reference bins together yielding a single entity bin per real-world entity. The ground truth binning control logic 110 supports that task by presenting user interface information in a way that allows the user to rapidly identify which entity bin a specific document belongs. The ground truth binning control logic 110 implements a process by which the human annotator can quickly iterate over all input entity bins. This reduces the overall complexity of the task to making simple one-to-one comparison with the generated user interface.

Referring to FIGS. 2 and 3, there are shown respective example system operations generally designated by the reference characters 200, and 300 of computer system 102 of FIG. 1, for implementing an interface for rapid ground truth binning in accordance with preferred embodiments.

Referring to FIG. 2, system operations 200 for binning documents starting at a block 201 with loading documents as indicated at a block 202, such as receiving a set of entities E (E1, E2, . . . , En) and a set of documents D (D1, D2, . . . , Dm) wherein the each document Di has at least one entity Ei in the set of entities E (E1, E2, . . . , En). As indicated at a block 204, a first unbinned document Di is selected. As indicated at a block 206, providing a user interface (UI) allowing a user to view passages and select options related to confirming or denying an equivalence between the entity Ej in the document Di and the document Dk. As indicated at a decision block 208, checking a user entry using the user interface and confirming or denying equivalence is performed. When a document match is not identified, a new bin is created with the current document as indicated at a block 210. Otherwise responsive to the user utilizing the UI and confirming the equivalence, the input bin of the document Di with the document Dk with reference to the entity Ej are combined or merged in existing output bin and aggregating related entities contained in this output bin is performed as indicated at a block 212. As indicated at a decision block 214, checking for more documents Di to bin is performed. When no more documents Di to bin are identified, then the operations end as indicated at a block 212 where the process is completed when all input entity bins have been assigned to an output bin. Otherwise when more documents Di to bin are identified, then the operations return to block 204 to continue binning remaining documents.

Referring to FIG. 3, system operations 300 for the entity match task starting at a block 301 with searching output bins for certain terms as indicated at a block 302. At block 302, content of the retrieval step is presented in the UI with visual guides for the user to identify key information and speed up the decision-making process including 1. Display the bin's entity name and the titles of the documents in the bin's document collection; 2. Aggregate all related entities found in the document collection and display the related entities above the document text; and 3. Highlight the spans in the text passages from which the relationship was identified.

As indicated at a block 304, iterate through bins: the user can discard an output bin as candidate matches for the current documents allowing the user to quickly parse through the list of output bins. As indicated at a block 306, highlight all entities in all output bins that match related entities of the current document that are highlighted. The output bins are sorted based on how many entities match the current document. At block 306, the user interface also highlights how well the name of the source bin matches the name of the target bin, for example, "Mike Jordan" vs "Michael Jordan." The user can quickly identify whether there is a good match in the set of output entity bins.

Figure 4:
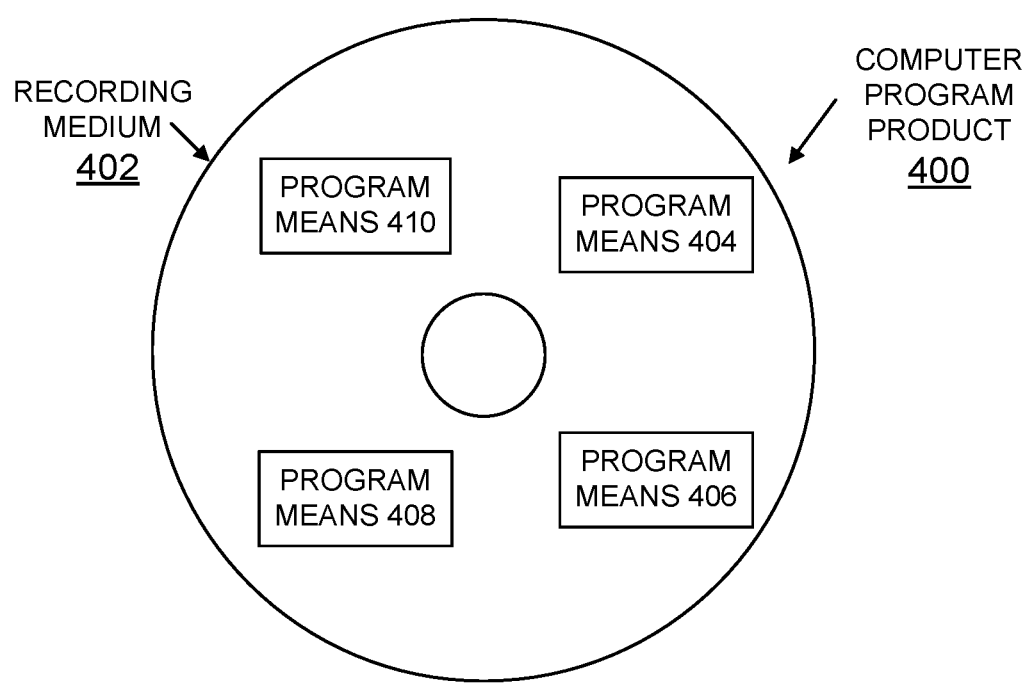
FIG. 4 is a block diagram illustrating a computer program product in accordance with the preferred embodiment.

Referring now to FIG. 4, an article of manufacture or a computer program product 400 of the invention is illustrated. The computer program product 400 is tangibly embodied on a non-transitory computer readable storage medium that includes a recording medium 402, such as, a floppy disk, a high capacity read only memory in the form of an optically read compact disk or CD-ROM, a tape, or another similar computer program product. The computer readable storage medium 402, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Recording medium 402 stores program means or instructions 404, 406, 408, and 410 on the non-transitory computer readable storage medium 402 for carrying out the methods for implementing an interface for rapid ground truth binning in the system 100 of FIG. 1.

Computer readable program instructions 404, 406, 408, and 410 described herein can be downloaded to respective computing/processing devices from a computer readable storage medium or to an external computer or external storage device via a network, for example, the Internet, a local area network, a wide area network and/or a wireless network. The computer program product 400 may include cloud-based software residing as a cloud application, commonly referred to by the acronym (SaaS) Software as a Service. The network may comprise copper transmission cables, optical transmission fibers, wireless transmission, routers, firewalls, switches, gateway computers and/or edge servers. A network adapter card or network interface in each computing/processing device receives computer readable program instructions 404, 406, 408, and 410 from the network and forwards the computer readable program instructions for storage in a computer readable storage medium within the respective computing/processing device.

A sequence of program instructions or a logical assembly of one or more interrelated modules defined by the recorded program means 404, 406, 408, and 410, direct the system 100 for implementing an interface for rapid ground truth binning of the preferred embodiment.

While the present invention has been described with reference to the details of the embodiments of the invention shown in the drawing, these details are not intended to limit the scope of the invention as claimed in the appended claims.

What is claimed is:

1. A system for implementing an interface for rapid ground truth binning comprising:
    a ground truth binning control logic;
    said ground truth binning control logic tangibly embodied in a non-transitory machine readable medium used to implement rapid ground truth binning;
    said ground truth binning control logic, receiving a first set of documents wherein each document in the first set has at least one reference to a first entity;
    said ground truth binning control logic, receiving an unbinned document wherein the unbinned document has at least one reference to a second entity;
    said ground truth binning control logic, providing a user interface for each received document allowing a user to view passages and select options related to confirming or denying an equivalence between the second entity in the unbinned document and the first entity, wherein providing the user interface comprises:
      displaying a name of the first entity;
      displaying a title of each document in the first set of documents;
      displaying a set of references to the first entity, wherein each reference from the set of references is found in a document in the first set of documents;
      displaying a similarity between the first entity and the second entity; and
    said ground truth binning control logic, responsive to the user utilizing the user interface and confirming the equivalence, combining the unbinned document with the first set of documents.

2. The system as recited in claim 1, includes said ground truth binning control logic, responsive to combining the unbinned document with the first set of documents includes aggregating related entities contained in the first set of documents.

3. The system as recited in claim 1, wherein said ground truth binning control logic, providing a user interface enables rapidly developing ground-truth sets needed to train a statistical cross-document coreference model operating over entity bin objects, while reducing complexity of the overall task.

4. The system as recited in claim 1, wherein said ground truth binning control logic, providing a user interface includes highlighting spans in text passages from the unbinned document and a document collection of the first set of documents from which a relationship was identified.

5. The system as recited in claim 1, wherein said ground truth binning control logic, providing a user interface includes providing visual guides to help a user identify key information and, therefore, speed up the decision-making process.

6. The system as recited in claim 5, wherein said key information enables the user to speed up a decision-making process.

7. The system as recited in claim 1, wherein said ground truth binning control logic, providing a user interface includes separately organizing and displaying an entity bin of an input document and the first set of documents.

8. The system as recited in claim 1, wherein said ground truth binning control logic, providing a user interface includes providing a search capability allowing the user to filter the first set of documents for certain terms.

9. A method for implementing an interface for rapid ground truth binning comprising:
    providing a ground truth binning control logic;
    said ground truth binning control logic tangibly embodied in a non-transitory machine readable medium used to implement rapid ground truth binning comprising;
    receiving a first set of documents wherein each document in the first set has at least one reference to a first entity;
    receiving an unbinned document wherein the unbinned document has at least one reference to a second entity;
    providing a user interface allowing a user to view passages and select options related to confirming or denying an equivalence between the second entity in the unbinned document and the first entity, wherein providing the user interface comprises:
      displaying a name of the first entity;
      displaying a title of each document in the first set of documents;
      displaying a set of references to the first entity, wherein each reference from the set of references is found in a document in the first set of documents;
      displaying a similarity between the first entity and the second entity; and
    responsive to the user utilizing the user interface and denying the equivalence, creating a new output document entity bin for the unbinned document.

10. The method as recited in claim 9, includes providing visual guides enabling a user to identify key information.

11. The method as recited in claim 9, includes providing a search capability allowing a user to filter output document entity bins for certain terms.

12. The system as recited in claim 1, includes:
    said ground truth binning control logic, receiving a second set of documents, wherein each document in the second set has at least one reference to a third entity;
    said ground truth binning control logic, determining that the second set of documents contains fewer references to the third entity than the first set of documents contains references to the first entity, and wherein providing the user interface further comprises:
      displaying a name of the third entity;
      displaying a title of each document in the second set of documents;
      displaying a set of references to the third entity, wherein each reference from the set of references is found in a document in the second set of documents;

displaying a similarity between the third entity and the second entity; and based on the determining, sorting the first set of documents and the second set of documents.

13. A computer program product, the computer program product comprising a computer readable storage medium having program instructions embodied therewith, the program instructions executable by a computer to cause the computer to:

provide a ground truth binning control logic;

receive a first set of documents wherein each document in the first set has at least one reference to a first entity;

receive an unbinned document wherein the unbinned document has at least one reference to a second entity;

provide a user interface allowing a user to view passages and select options related to confirming or denying an equivalence between the second entity in the unbinned document and the first entity, wherein providing the user interface comprises:

displaying a name of the first entity;

displaying a title of each document in the first set of documents;

displaying a set of references to the first entity, wherein each reference from the set of references is found in a document in the first set of documents;

displaying a similarity between the first entity and the second entity; and responsive to the user utilizing the user interface and confirming the equivalence, combining the unbinned document with the first set of documents.

* * * * *